United States Patent Office 2,938,046
Patented May 24, 1960

2,938,046

DITHIOCARBAMYL-CONTAINING SILICON COMPOUNDS

Edward L. Morehouse, Snyder, N.Y., assignor to Union Carbide Corporation, a corporation of New York No Drawing. Filed Oct. 11, 1956, Ser. No. 615,240

4 Claims. (Cl. 260—448.2)

This invention relates to organosilicon compounds and to processes for their production. More particularly this invention is concerned with organosilicon compounds containing, among other functional groups, the dithiocarbamyl group

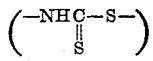

in which the nitrogen atom is linked to a silicon atom through a polymethylene chain of at least 3 carbon atoms, as new compositions of matter. This invention is also concerned with the metal salts of the organosilicon compounds contemplated above. In addition, this invention is concerned with processes for producing said organosilicon compounds and to uses thereof.

The present invention is based upon my discovery that organosilicon compounds containing a dithiocarbamyl group

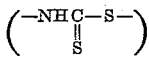

in which the nitrogen atom is linked to a silicon atom through a polymethylene linkage can be produced by reacting an organosilicon compound containing an aminoalkylsilyl grouping $(H_2N(CH_2)_aSi\equiv)$ with carbon disulfide, as represented in the free acid form by the following equation:

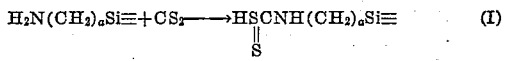
(I)

wherein $a$ is an integer having a value of at least 3. The present invention is further based upon my discovery that organosilicon compounds containing a dithiocarbamyl group attached to the silicon atom thereof through a polymethylene linkage can be caused to react with metal salts to produce the corresponding metal dithiocarbamates, as represented by the equation:

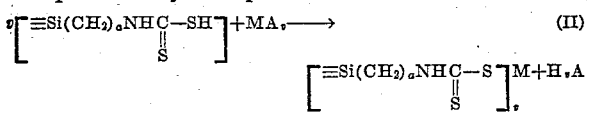

wherein M represents a metal atom; $a$ represents an anion; and $v$ is an integer having a value of at least 1 depending on the valence of the metal atom.

According to my studies reaction (I) is a general one and is applicable to all organosilicon compounds which contain the aminoalkylsilyl grouping depicted above. Suitable for use in my process are the aminoalkylalkoxysilanes and the aminoalkylpolysiloxanes, including copolymeric materials which contain both aminoalkylsiloxane and hydrocarbon siloxane units.

Typical of the aminoalkylalkoxysilanes suitable for use as our organosilicon starting materials are those compounds represented by the structural formula:

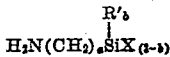

wherein R' represents an alkyl group such as methyl, ethyl, propyl, butyl and the like, or an aryl group such as phenyl, naphthyl, tolyl, or an aralkyl, group such as benzyl and the like; X represents an alkoxy group such as methoxy, ethoxy, propoxy and the like, $a$ is an integer having a value of at least 3 and preferably a value of from 3 to 4 and $b$ is an integer having a value of from 0 to 2 and preferably a value of from 0 to 1. Illustrative of such aminoalkylalkoxysilanes are gamma-aminopropyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as my organosilicon starting materials are those polysiloxanes which contain the structural unit:

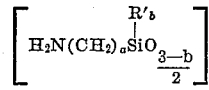

wherein R', $a$ and $b$ have the same values described above. Such polysiloxanes are prepared by the hydrolysis and condensation of those aminoalkylalkoxysilanes described above or by the co-hydrolysis and co-condensation of such aminoalkylalkoxysilanes with other hydrolyzable silanes and can include: aminoalkylpolysiloxanes of the trifunctional variety (i.e. where $b=0$), aminoalkylalkyl- and aminoalkylarylpolysiloxanes of the difunctional variety which include cyclic or linear polysiloxanes (i.e. where $b=1$) and linear aminoalkyldialkyl-, aminoalkyldiaryl- and aminoalkylalkylaryldisiloxanes of the monofunctional variety (i.e. where $b=2$) as well as mixtures of compounds produced by the cohydrolysis of difunctional and trifunctional aminoalkylsilanes.

Suitable starting aminoalkylpolysiloxanes of the trifunctional variety can be more specifically depicted as containing the structural unit:

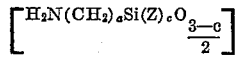

wherein $a$ has the value previously described, $z$ represents an hydroxyl or alkoxy group and $c$ has an average value of from 0 to 1, and can be as high as 2; preferably $c$ has a value from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzates so formed to produce the desired polymer.

Suitable starting aminoalkylpolysiloxanes of the difunctional variety, which include cyclic and linear polysiloxanes, can be more specifically defined by the structural formula:

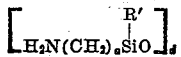

wherein R' and a have the values previously described and d is an integer having a value of at least 3 and can be as high as 7 for the cyclic aminoalkylsiloxanes and higher for the linear aminoalkylpolysiloxanes. Such cyclic and linear aminoalkylpolysiloxanes can be prepared by the hydrolysis and condensation of aminoalkylalkyl- or aminoalkylaryldiethoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use as the organosilicon starting material in my process are the cyclic tetramer of gamma-aminopropylmethylsiloxane, the cyclic tetramer of delta-aminobutylphenylsiloxane and the like. Illustrative of suitable linear aminoalkylpolysiloxanes are gamma-aminopropylmethylpolysiloxane, gamma-aminopropylethylpolysiloxane, delta-aminobutylmethylpolysiloxane and the like.

Included among the useful starting linear aminoalkylpolysiloxanes are the alkyl, alkoxy and hydroxyl endblocked polysiloxanes which contain from 1 to 3 of such groups bonded to the terminal silicon atoms of the molecules comprising the polymeric chains. Thus I can also employ as my starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monothoxydimethylsilyl end-blocked gamma-aminopropylphenylpolysiloxane and the like. The end-blocked linear aminoalkylalkyl- and aminoalkylarylpolysiloxanes useful in my process can be prepared by the equilibration of cyclic aminoalkylsiloxanes with silicon compounds containing predominantly silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as starting materials can be depicted as containing both of the structural units:

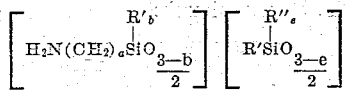

wherein R', a and b have the values described above, R" represents an alkyl or aryl group and e is an integer having a value of from 0 to 2. My copolymers can be mixtures of trifunctional aminoalkylsiloxane units (where $b=0$) with trifunctional alkyl-, aryl- or mixed alkyl- and arylsiloxane units (where $e=0$) or with difunctional alkyl, aryl- or mixed alkyl- and arylsiloxane units (where $e=1$). They can also include mixtures of difunctional aminoalkylsiloxane units (where $b=1$) with trifunctional alkyl-, aryl- or mixed alkyl- and arylsiloxane units (where $e=0$) or with difunctional alkyl-, aryl or mixed alkyl- and arylsiloxane units (where $e=1$).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups. The equilibration will also produce some copolymeric cyclic siloxanes.

The aminoalkylalkoxysilanes and aminoalkylpolysiloxanes as well as copolymers containing aminoalkylsiloxane and hydrocarbon siloxane units are all disclosed and claimed as new compositions of matter in copending U.S. applications Serial Nos. 615,466, 615,481, 615,483 and 615,507, filed concurrently herewith, Serial Nos. 615,481 and 615,483 now being abandoned. Processes for producing such compounds are also disclosed and claimed in said copending applications.

The reaction between carbon disulfide and an organosilicon compound containing the aminoalkylsilyl grouping is exothermic in nature and can be carried out by forming a mixture of the reactants. I prefer to conduct the reaction in the presence of a liquid compound in which my starting materials are soluble and which is non-reactive with carbon disulfide or the amino group of my organosilicon reactant. Among the liquid organic compounds suitable for use in my process are: the aromatic hydrocarbons such as benzene, toluene and the like, the aliphatic ethers such as diethyl ether and the like as well as other organic compounds including petroleum ether, ethylene glycol dimethyl ether and the like. The amount of such liquid organic compounds suitable for use as solvents in my process is not narrowly critical and can vary over a wide range. I prefer to employ the solvent in amounts at least about equal in volume to the combined liquid volume of my starting materials. In addition, water can be used as the liquid compound.

The amount of carbon disulfide and the organosilicon compound employed in my process is not narrowly critical and can vary over a wide range. I prefer to employ the starting materials in chemically equivalent amounts. That is, for each aminoalkylsilyl grouping present in my organosilicon reactant there should be one molecule of carbon disulfide present in the reaction mixture. Amounts of either starting material smaller or greater than that preferred can also be employed; however, no commensurate advantage is obtained thereby.

In carrying out my process, the reaction between an organosilicon containing the aminoalkylsilyl grouping and carbon disulfide is preferably conducted at temperatures below the boiling point of carbon disulfide, although higher temperatures can be employed when the reaction is conducted in closed systems. I have found it convenient to conduct the reaction at temperatures of from as low as $-10°$ C. to temperatures as high as $40°$ C.

One method for conducting the reaction between my starting materials is to add carbon disulfide to a solution of the organosilicon compound. By so doing the tendency for side reactions to occur is minimized. The organosilicon compounds of my invention can be recovered from the product of the reaction by known separation techniques.

In the practice of my invention, I can conduct the reaction between my starting materials in the presence of a base to first produce the corresponding ion of the dithiocarbamylalkylsilyl compounds of my invention

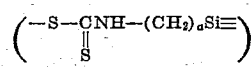

and to subsequently produce the corresponding salt thereof. Any suitable base can be employed including amounts of the starting organosilicon compounds above the chemical equivalent. I can also use such organic bases as pyridine, triethylamine, or the like as well as such inorganic bases as sodium hydroxide, potassium hydroxide, zinc oxide, cupric hydroxide, calcium oxide, potassium silanolate and the like. I have found that the amount of the base employed is not critical and can vary over a wide range. I prefer to employ the base in an amount chemically equivalent to dithiocarbamylalkylsilyl groups present in the organosilicon products of the invention.

The monomeric organosilicon compounds of this invention which contain a dithiocarbamyl group bonded to the silicon atom thereof through a polymethylene linkage are known as the dithiocarbamylalkylalkoxysilanes and can be represented in the free acid form by the following formula:

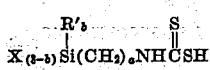

wherein R′, X, b and a have the same values described above. These hydrolyzable dithiocarbamylsilanes can be hydrolyzed and condensed to produce the corresponding dithiocarbamylpolysiloxanes.

The polymeric silicon-containing dithiocarbamates produced in this invention are the siloxane polymers containing units represented in the free acid form by the formula:

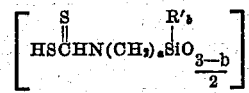

and siloxane copolymers containing units represented by the following formulae:

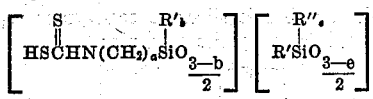

wherein R′, R″, a, b and e have the same values described above; and wherein the polymeric siloxane compounds may contain alkoxy or hydroxyl groups bonded to some of the silicon atoms.

The above depicted monomeric and polymeric organosilicon compounds containing the dithiocarbamyl group, either as the free acid or as the amine or metal salt, can be reacted with metal salts to produce the corresponding metal dithiocarbamate. Thus, as will be illustrated below, one of the important uses of the products of this invention is in the extraction of metals from aqueous solutions of the salts of said metals.

The extraction of metals from aqueous solutions of salts thereof with the aid of my compounds is a metathetical reaction and can be carried out by forming a mixture of the reactants at temperatures ranging from as low as about 10° C. up to the boiling point of the reaction mixture. By the processes of this invention, and for illustrative purposes only, my organosilicon compounds may be used in preparing the dithiocarbamate salts of the following metals: lithium, sodium, potassium, cesium, beryllium, magnesium, calcium, strontium, barium, rubidium, copper, silver, gold, zinc, cadmium, mercury, scandium, yttrium, titanium, zirconium, hafnium, thorium, vanadium tantalum, paladium, chromium, molybdenum, tungsten, uranium, manganese, iron, cobalt, nickel, osmium, platinum, cerium, praseodymium, aluminum, tin, lead, antimony and bismuth. The dithiocarbamate salts of this invention can be obtained, for example, from the halide and sulfate salts of the above metals. Dithiocarbamate salts so produced may be soluble in organic solvents such as diethyl ether, benzene, toluene, etc. depending upon the silicon compound used.

The novel compounds of this invention, in addition to their use as extractants for metals, can also be used as fungicides, insecticides and sizes. The difunctional siloxane polymers and copolymers produced can be oils, which are useful themselves as lubricants or they can be employed as modifying ingredients for known silicone lubricating oils.

Such difunctional polymers can also be employed to modify silicon elastomers. The trifunctional siloxane polymers are cross-linked in nature and set to solid materials useful as coatings. They find more common use as additives or modifying ingredients for the known methylphenyl thermosetting types of polysiloxanes.

The following examples further serve to illustrate this invention.

*Example 1*

A 500 ml. Pyrex flask was equipped with a stirrer, condenser and thermometer and charged with 200 ml. of ethylene glycol dimethyl ether, a solution of 4.1 g. of sodium hydroxide in 15 ml. of water and 100 g. of a modified dimethyl silicone oil having an average molecular weight of about 1000 and containing about 10 weight-percent delta-aminobutylmethylsiloxy groups. At 25 to 35° C., 9.2 g. of carbon disulfide was slowly added in a dropwise manner over a ½ hour period to the reaction flask. The silicon-containing sodium dithiocarbamate produced can be represented by the average formula:

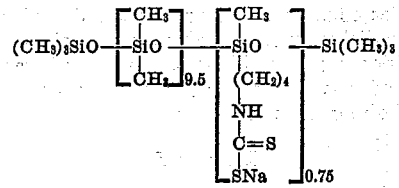

A solution of 12.1 g. of cobalt chloride in 20 ml. of water was added at about 25° C. in a dropwise manner to the above-indicated organosilicon sodium dithiocarbamate solution and stirred for about one-half hour. The reaction mixture was transferred to a separatory funnel and 1000 ml. of water, 300 ml. of diethyl ether and 20 ml. of acetic acid were added and the cobalt salt of the organosilyl dithiocarbamate was extracted out by continued extraction with several portions of ether. The yellow-brown ether extract containing the cobalt organosilyl dithiocarbamate was stripped at reduced pressure to a pot temperature of about 75° C. The residue, the cobalt organosilyl dithiocarbamate, was a viscous, yellow-brown oil, which was soluble in benzene, petroleum ether, chloroform and ethanol. The infrared absorption curve confirmed the presence of —NH—, —C—NH—C— and ≡Si—O—Si≡ bonding and the absence of —NH₂ groups.

*Example 2*

A reaction mixture containing 15 ml. of anhydrous ethylene glycol dimethyl ether, 3 ml. of gamma-aminopropyltriethoxysilane and 2 ml. of potassium silanolate having a potassium content of about 3.5% by weight was prepared and the mixture was caused to react with 2 ml. of carbon disulfide as described in Example 1 to produce a pale yellow solution of potassium gamma-triethoxysilylpropyldithiocarbamate which can be represented by the following formula:

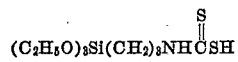

(A) A 3 ml. portion of the above pale yellow solution of potassium triethoxysilylpropyldithiocarbamate solution was transferred to a test tube and 0.3 g. of anhydrous nickel chloride was added. Upon shaking the nickel chloride dissolved and the color of the solution changed to an intense yellow indicating the formation of nickel gamma-triethoxysilylpropyldithiocarbamate.

(B) A 3 ml. portion of the above pale yellow solution of potassium gamma-triethoxysilylpropyldithiocarbamate was diluted with 10 ml. of water. Then 2 ml. of a 0.1 N nickel chloride solution and 3 ml. of toluene were added and the mixture was stirred and allowed to settle. Two layers formed with the upper organic layer having an intense yellow-brown color and containing dissolved therein the toluene-soluble nickel gamma-triethoxysilylpropyldithiocarbamate, and the lower aqueous layer being essentially colorless.

*Example 3*

A reaction mixture was prepared comprising:

| | Ml. |
|---|---|
| Anhydrous ethylene glycol dimethyl ether | 15 |
| Potassium silanolate (containing 3% potassium) | 0.2 |
| 10 weight-percent delta-aminobutylmethyl-modified dimethyl silicone oil, M.W. 1000 | 5 |
| Carbon disulfide | 3 |

The reaction was carried out under conditions similar to those described in Example 2. The pale yellow solution containing the potassium dithiocarbamate silicone oil was then reacted with 3 ml. of 0.1 N cupric chloride. The resultant deep yellow copper dithiocarbamate silicone oil was soluble in ether.

*Example 4*

The potassium dithiocarbamate silicone oil was prepared under conditions similar to those described in Example 3 and then reacted with nickelous chloride. The nickel dithiocarbamate silicone oil produced was soluble in ether and was a much darker yellow than the copper derivative obtained in Example 3.

*Example 5*

A reaction mixture was prepared comprising:

| | |
|---|---|
| Water ml | 15 |
| Sodium hydroxide g | 0.5 |
| Delta-aminobutylmethylsilicone cyclic tetramer ml | 3 |
| Carbon disulfide ml | 2 |

The reaction was carried out in a test tube under conditions similar to those described in Example 2. The tetra-sodium dithiocarbamate of the cyclic tetramer was then reacted with 2 ml. of aqueous 0.1 N nickelous chloride. The resultant product was an intensely orange solution of the tetra-nickel dithiocarbamate of the cyclic tetramer.

What is claimed is:

1. Dithiocarbamyl-containing silicon compounds selected from the group consisting of dithiocarbamyl silanes represented in the free acid form by the formula:

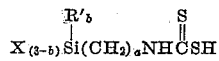

wherein R' represents a member selected from the group consisting of alkyl radicals, aralkyl radicals and aryl radicals; X represents an alkoxy radical, $a$ is an integer having a value of at least 3; and $b$ is an integer having a value of from 0 to 2.

2. Dithiocarbamyl-containing polysiloxanes selected from the group consisting of siloxane polymers containing units represented in the free acid form by the formula:

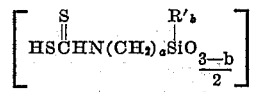

and polysiloxane copolymers containing units represented in the free acid form by the formulae:

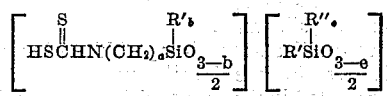

wherein R' represents a member selected from the group consisting of alkyl radicals, aryl radicals and aralkyl radicals; R" represents a member selected from the group consisting of alkyl radicals and aryl radicals; $a$ is an integer having a value of at least 3; $b$ is an integer having a value of from 0 to 2; and $e$ is an integer having a value from 0 to 2.

3. The dithiocarbamic siloxane copolymer represented in the free acid form by the formula:

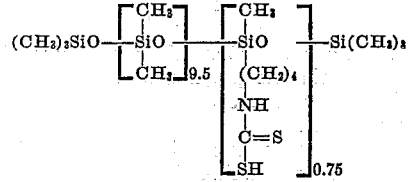

4. The dithiocarbamylsilane represented in the free acid form by the formula:

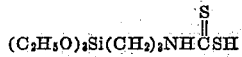

References Cited in the file of this patent

UNITED STATES PATENTS

| | | |
|---|---|---|
| 2,486,162 | Hyde | Oct. 25, 1949 |
| 2,557,803 | Sommer | June 19, 1951 |
| 2,754,311 | Elliott | July 10, 1956 |
| 2,754,312 | Elliott | July 10, 1956 |
| 2,762,823 | Speier | Sept. 11, 1956 |
| 2,762,826 | Noll | Sept. 11, 1956 |
| 2,832,754 | Jex et al. | Apr. 29, 1958 |

UNITED STATES PATENT OFFICE
CERTIFICATE OF CORRECTION

Patent No. 2,938,046                           May 24, 1960

Edward L. Morehouse

It is hereby certified that error appears in the printed specification of the above numbered patent requiring correction and that the said Letters Patent should read as corrected below.

Column 1, lines 42 to 44, the formula following the arrow should appear as shown below instead of as in the patent:

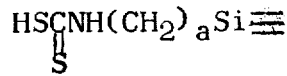

$$HS\underset{\underset{S}{\|}}{C}NH(CH_2)_aSi\equiv$$

column 6, line 45, for "propyldithocarbamate" read -- propyldithiocarbamate --; lines 47 to 49, the formula should appear as shown below instead of as in the patent:

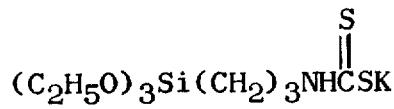

$$(C_2H_5O)_3Si(CH_2)_3NH\overset{\overset{S}{\|}}{C}SK$$

Signed and sealed this 25th day of October 1960.

(SEAL)
Attest:
KARL H. AXLINE                              ROBERT C. WATSON
Attesting Officer                        Commissioner of Patents